(12) United States Patent
Wenzler et al.

(10) Patent No.: US 9,310,606 B2
(45) Date of Patent: Apr. 12, 2016

(54) CONTROLLER FOR ACTUATING A MICROMECHANICAL ACTUATOR, ACTUATING SYSTEM FOR ACTUATING A MICROMECHANICAL ACTUATOR, MICRO-MIRROR SYSTEM AND METHOD FOR ACTUATING A MICROMECHANICAL ACTUATOR

(71) Applicants: Axel Wenzler, Reutlingen (DE); Mohamad Iyad Al Dibs, Pliezhausen (DE)

(72) Inventors: Axel Wenzler, Reutlingen (DE); Mohamad Iyad Al Dibs, Pliezhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/471,765

(22) Filed: Aug. 28, 2014

(65) Prior Publication Data
US 2015/0062684 A1 Mar. 5, 2015

(30) Foreign Application Priority Data
Aug. 28, 2013 (DE) .......................... 10 2013 217 105

(51) Int. Cl.
*G02B 26/08* (2006.01)
(52) U.S. Cl.
CPC .................................. *G02B 26/0841* (2013.01)
(58) Field of Classification Search
CPC ............. G02B 26/0841; G02B 26/085; G02B 26/0858; G02B 26/0866

USPC ....................................................... 359/224.1
See application file for complete search history.

(56) References Cited

U.S. PATENT DOCUMENTS

| 7,952,783 | B2 | 5/2011 | Holmes et al. |
| 2006/0164708 | A1* | 7/2006 | Park et al. ...................... 359/205 |
| 2008/0030825 | A1* | 2/2008 | Sasagawa et al. ............. 359/224 |
| 2013/0094071 | A1* | 4/2013 | Redford ...................... 359/221.2 |

* cited by examiner

*Primary Examiner* — Frank Font
(74) *Attorney, Agent, or Firm* — Kenyon & Kenyon LLP

(57) ABSTRACT

A controller for actuating a micromechanical actuator, including a first signal input which is designed to receive a reference signal, a second signal input which is designed to receive a measuring signal which denotes a recorded response by the micromechanical actuator to a control signal, a first controller element which is designed to filter and/or to attenuate predefined frequency modes and/or predefined frequency components in the received reference signal and to output a filtered and/or attenuated reference signal, a second controller element which is designed to modify the received measuring signal in order to minimize the quality of the first mode of the received measuring signal and to output a modified measuring signal, a third controller element which is designed to minimize the deviation between the filtered and/or attenuated reference signal and the received measuring signal and to output a minimized reference signal, a fourth controller element which is designed to modify the bandwidth of the received measuring signal and to subtract it from the minimized reference signal, which makes up the control signal. Furthermore, a corresponding actuating system, a corresponding micro-mirror system and a corresponding method are described.

12 Claims, 8 Drawing Sheets

CONTROLLER FOR ACTUATING A MICROMECHANICAL ACTUATOR, ACTUATING SYSTEM FOR ACTUATING A MICROMECHANICAL ACTUATOR, MICRO-MIRROR SYSTEM AND METHOD FOR ACTUATING A MICROMECHANICAL ACTUATOR

FIELD OF THE INVENTION

The present invention relates to a controller for actuating a micromechanical actuator, to an actuating system for actuating a micromechanical actuator, to a micro-mirror system and to a method for actuating a micromechanical actuator.

BACKGROUND INFORMATION

Micromechanical actuators are used in a plurality of applications today. For example, micro-mirrors are utilized in projector units which are to be set up in a very small installation space.

In such projector units, micro-mirrors are usually utilized which represent a so-called MEMS, i.e., micro electro mechanical system. These types of MEMS mirrors often have several mechanical resonance points which may be correspondingly electrically excited and which are also known as modes or poles in the transfer function. Furthermore, such MEMS mirrors also have anti-resonance modes which are also known as zero points in the transfer function or notch.

The modes of the MEMS mirrors are subdivided into useful modes and spurious modes. In particular, the excitation of spurious modes has a negative impact on the quality of the image projected.

The mentioned MEMS mirrors form a so-called inert spring mass system which in a first approximation may be modeled as a second order low pass (PT2 element.) In this configuration, the cutoff frequencies of the inert spring mass system are defined by its first mode.

This type of MEMS mirror may either be operated resonantly on either one or multiple useful modes or may be operated quasi-statically. The quasi-static actuation takes place with the aid of a low-frequency signal and avoids excitation of the modes.

FIG. 9 shows the transfer functions for different MEMS micro-mirrors in a Bode plot. The upper diagram shows the attenuation in dB over the frequency. The lower diagram shows the phase in degrees over the frequency. It is apparent in the upper diagram that the five micro-mirrors, of which the transfer functions are shown, exhibit a plurality of resonance modes and anti-resonance modes. These are shown in the diagram with spikes which spike upward or downward. Furthermore, it is apparent in the lower diagram that the mirrors exhibit different phase responses as a function of the frequency. In particular, several mirrors exhibit a phase response which is, at least up to a certain frequency, between –0° and –180°, while in other mirrors the phase response exceeds beyond –180°.

Usually, two MEMS mirrors are required to construct the image with the aid of MEMS mirrors, one of the MEMS mirrors being actuated resonantly and one of the MEMS mirrors being operated quasi-statically. The MEMS mirror which is being operated resonantly is in charge of the line projection of the images, and the MEMS mirror which is being operated quasi-statically is in charge of the line-by-line image construction. Another possibility is using a 2D mirror which is operated both in a vertical and in a horizontal direction.

The MEMS mirror which is being operated in the quasi-statical mode must be actuated in such a way that the resonance modes of the micro-mirror are not excited.

Usually, an MEMS mirror in quasi-statical mode is actuated using a sawtooth signal as a reference variable to, for example, generate a frame rate of 60 Hz. During this process, the sawtooth signal exhibits, in the frequency range, the multiples of the even and odd harmonics of the base frequency. The diagram in FIG. 10 shows two possible sawtooth signals having different return times as dashed and solid curves. The time is plotted on the x-axis, and the amplitude of the sawtooth signal is plotted on the y-axis. The rising edges in FIG. 10 are those edges which guide the MEMS mirror line by line.

The falling edges represent the return of the MEMS mirror into its initial position. The corresponding sawtooth signal in the frequency range is shown in FIG. 11.

FIG. 11 shows that the sawtooth signal exhibits frequency components at 60 Hz and the multiples of 60 Hz, i.e., 120 Hz, 180 Hz and so on, in the frequency range. When actuating an MEMS mirror using such a type of sawtooth signal, one of the multiples of the base frequency might excite a resonance mode of the respective MEMS mirror.

Usually, the MEMS mirrors in the quasi-static mode are actuated by using linear drivers or digital drivers. The micro-mirrors are controlled in a closed loop to achieve a sufficient accuracy during the actuation or to increase the linear deflection. During this process, different controllers may be used, for example, adaptive PD controllers, current controllers and position controllers in feed forward structure, LMS harmonic controllers, iterative harmonic coefficient determination, and the like. All controllers used have in common that they need a very large system bandwidth and thus require a very high amount of computing power.

U.S. Pat. No. 7,952,783 describes a controller working by using the iterative harmonic coefficient determination method.

For example, systems having MEMS mirrors and controllers usually require a controller bandwidth of 1 MHz to control every image line exactly. Furthermore, some of the known controller concepts require additional status information of the MEMS mirror which may actually only be determined with great difficulty or which is very difficult to estimate.

Large system bandwidth and high computing power mean a large space requirement in the IC control integrated circuits, for example, for analog-digital converters, microcontrollers, digital-analog converters, driver stages and the like.

SUMMARY

The present invention provides a controller for actuating a micromechanical actuator, an actuating system for actuating a micromechanical actuator, a micro-mirror system, and a method.

The present invention provides for the following:

A controller for actuating a micromechanical actuator in a closed loop circuit, having a first signal input which is designed to receive a reference signal, a second signal input which is designed to receive a measuring signal which denotes a recorded response by the micromechanical actuator to a control signal, a first controller element which is designed to filter and/or to attenuate predefined frequency modes and/or predefined frequency components in the received reference signal and to output a filtered and/or attenuated reference signal, a second controller element, which is designed to modify the received measuring signal in order to minimize the quality of the first mode and/or further modes of the closed loop circuit and to output a modified measuring signal, a third controller element which is designed to minimize the deviation between the filtered and/or attenuated reference signal and the received measuring signal and to output a minimized reference signal, a fourth controller element which is designed to adapt the received measuring signal to modify the bandwidth of the closed loop circuit and in order to add the adapted measuring signal to the sum of the minimized reference signal and the modified measuring signal, which makes up the control signal.

Furthermore, it is provided:

An actuating system for actuating a micromechanical actuator in a closed loop circuit including a signal generator which is designed to output a reference signal, a controller according to the present invention which is designed to receive the reference signal and to output a control signal for the micromechanical actuator, a first signal processing unit which is designed to process the control signal and to transmit it to the micromechanical actuator, and a second signal processing unit which is designed to record a response by the micromechanical actuator to the control signal and to transmit a measuring signal to a controller which denotes the recorded response.

Furthermore, it is provided:

A micro-mirror system including at least one micro-mirror and at least one actuating system according to the present invention which is designed to actuate the micro-mirror in a closed loop circuit.

Finally, it is provided:

A method for actuating a micromechanical actuator in a closed loop circuit including the steps of receiving a reference signal, receiving a measuring signal which denotes a recorded response by the micromechanical actuator to a control signal, filtering and/or attenuating predefined frequency modes and/or predefined frequency components in the reference signal, modifying the received measuring signal to minimize the quality of the first mode and/or further modes of the closed loop circuit, minimizing the deviation between the filtered and/or attenuated reference signal and outputting a minimized reference signal, adapting the bandwidth of the closed loop circuit by adapting the received measuring signal, for transmitting as the control signal to the micromechanical actuator the sum from the minimized reference signal and the modified measuring signal and the adapted measuring signal.

The present invention is based on the finding that the controller structures of known controllers for actuating a micromechanical actuator are very complex and thus very costly in the implementation.

The present invention is now based on the idea of taking this finding into account and providing a modular multi-feedback controller structure according to the present invention which exhibits only four linear controller elements.

The present invention provides that a reference signal is processed by a first controller element which filters or attenuates predefined frequency modes and/or predefined frequency components in the received reference signal. The difference between the reference signal prepared in such a way and a measuring signal which denotes the instantaneous position of the micromechanical actuator is processed by a third controller element, which minimizes the deviation between the filtered and/or attenuated reference signal and the received measuring signal.

Finally, the bandwidth of the closed loop circuit is modified by a fourth controller element by modifying the received measuring signal accordingly. This modified measuring signal is then subtracted from the minimized reference signal and transmitted as the control signal to the micromechanical actuator.

In particular, all controller elements of the present invention may be designed as linear controller elements.

The present controller structure minimizes, for example, the first resonance mode of the micro-mirror. Furthermore, the bandwidth of the closed loop circuit is adapted by processing the received measuring signal in such a way that technology-induced oscillations of the individual micro-mirrors are intercepted. Finally all resonance modes of the micro-mirror outside the controller bandwidth are suppressed or minimized and a conventional controller is used to minimize the controller deviation.

The present invention provides a modular controller structure which as a function of the micromechanical actuator used may be adapted very simply to the individual application. Furthermore, by using linear controller elements of a first to higher order, a very simple controller of little complexity is provided which may be very easily integrated, for example, into an ASIC.

The present invention enables the use of a controller with an adapted system bandwidth. Here a large system bandwidth is required to, for example, achieve a control signal which enables a short return time from the micromechanical actuator. However, in projectors, micro-mirrors require a return time of approximately 1% to 20% of the frame rate, for example, 60 Hz, to transmit the appropriate pixel information from a data source to the projector without this information needing to be stored in a buffer memory. This makes it possible, for example, to save the buffer memory. The fourth controller element makes it possible to adapt the system bandwidth to the required needs.

In one specific embodiment, the fourth controller element is designed to adapt the settling time in the received measuring signal and/or the return time of the controller and the micromechanical actuator. This makes it possible to specifically adapt the controller to different micromechanical actuators and different applications.

In one specific embodiment, the second controller element is designed to shift the complex poles of the first mode of the micromechanical actuator in the direction of the real axis of the pole-zero plot of the closed loop circuit. In this way, the quality of the first mode of the micromechanical actuator in the closed loop circuit is reduced or minimized and thus has no disadvantages for the image construction or the image projection.

In one specific embodiment, the second controller element is designed to, during modification, eliminate the first mode of the micromechanical actuator and to situate an additional pole with a predefined attenuation factor in the pole-zero plot of the closed loop circuit. In this way, the quality of the first mode of the micromechanical actuator in the closed loop circuit is reduced or minimized and thus has no disadvantages for the image construction or the image projection.

In one specific embodiment, the second controller element is designed to, during modification, eliminate other modes of the micromechanical actuator or decrease the quality of the modes.

In one specific embodiment, the second controller element is designed to shift the complex poles of the first mode of the micromechanical actuator in the direction of the real axis of the pole-zero plot of the closed loop circuit and to situate an additional pole with a predefined attenuation factor in the pole-zero plot of the closed loop circuit.

The different specific embodiments depend on the properties of the individual micromechanical actuator.

In one specific embodiment, the third controller element is designed as a PID controller element. This enables a very easy implementation of the third controller element. Other embodiments of the third controller element are also possible.

In one specific embodiment, the first controller element is designed as a digital filter element, in particular as an IIR filter element and/or a notch filter element and/or an FIR filter element. This makes a very simple implementation with little complexity of the first controller element and a very flexible adaptability of the first controller element possible.

The above-mentioned embodiments and refinements may be arbitrarily combined with each other, if useful. Additional possible embodiments, refinements and implementations of the present invention also include not explicitly named combinations of features of the present invention, which were previously described or are described in the following with regard to the exemplary embodiments. Those skilled in the art will in particular also add individual aspects as improvements or supplements to the particular basic form of the present invention.

DETAILED DESCRIPTION

Figure 1:
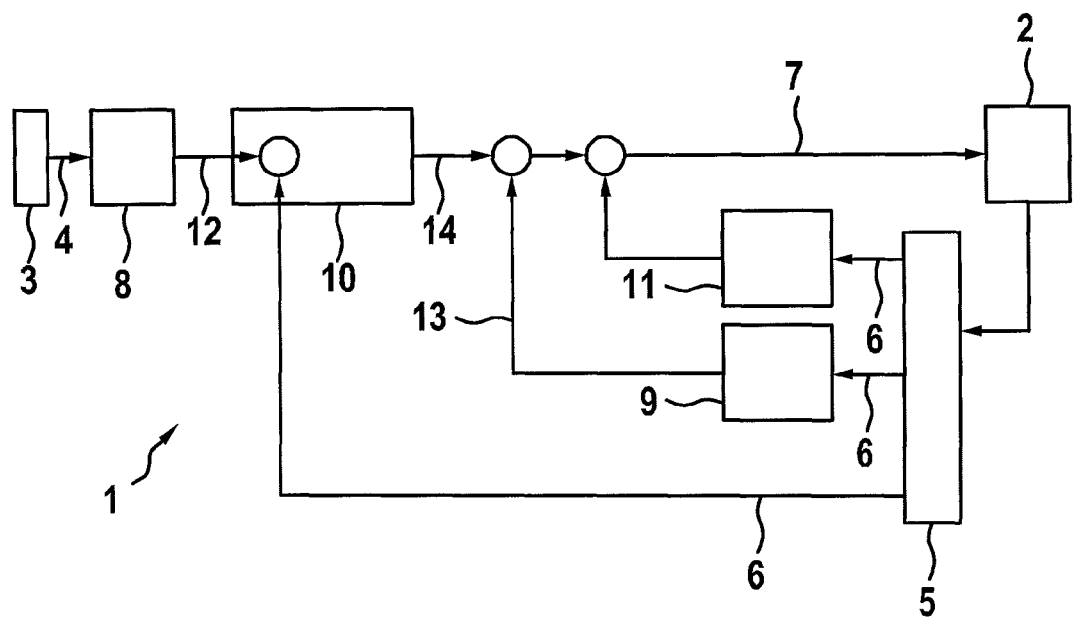
FIG. 1 shows a block diagram of one specific embodiment of a controller according to the present invention.

In all figures, identical or functionally equivalent elements and devices were denoted by the same reference numerals, unless indicated otherwise.

A micromechanical actuator is to be understood within the scope of this patent application as an actuator which is made of very small mechanical structures which may be actuated electrically. Such actuators are also known under the term MEMS (micro-electrical-mechanical-system).

A possible micromechanical actuator is, for example, a so-called micro-mirror. Micro-mirrors are, for example, used in video projectors to project the light of a light source line by line onto a screen.

To be able to use such a micro-mirror in a video projector it is necessary to control exactly the deflection of the micro-mirror. Knowledge of the transfer function of such a micro-mirror is required for an exact control. It may, for example, be the following:

$$G(s) = \frac{\left(\frac{1}{(2*pi*f02b)^2}*s^2 + 2*\frac{D02b}{2*pi*f02b}*s+1\right)*ks02*ks01}{ks03*\left(\frac{1}{(2*pi*f01)^2}*s^2 + 2*\frac{D01}{2*pi*f01}*s+1\right)*\left(\frac{1}{(2*pi*f02)^2}*s^2 + 2*\frac{D02}{2*pi*f02}*s+1\right)}$$

where:
D01: Attenuation factor of the first mode
D02: Attenuation factor of the second mode
D02b: Attenuation factor of the second anti-resonant mode
f01: Frequency of the first mode
f02: Frequency of the second mode
f02b: Frequency of the third mode
ks01: Component of mode 1 at the DC gain of the transfer function
ks02: Component of mode 2 at the DC gain of the transfer function
ks03: Component of mode 3 at the DC gain of the transfer function Reference signal is to be understood within the scope of this patent application as the signal which defines the desired position for the micromechanical actuator and which is supplied to the controller for the micromechanical actuator.

The measuring signal is the signal which represents the instantaneous position of the micromechanical actuator.

Modes, also called oscillation modes, refer to properties of standing waves with regard to their energy distribution. The modes occur, for example, usually in the resonance frequencies or the anti-resonance frequencies of the micromechanical actuator.

When within the scope of this patent application reference is made to a work step taking place in the pole-zero plot, the pole-zero plot of the micromechanical actuator or the MEMS element may be changed in the closed loop circuit. On the other hand it is also possible, for example, to achieve a shift of a zero point or pole in the pole-zero plot by applying the appropriate work step to a signal, for example, in the time range or frequency range, the work step directly changing the behavior of the micromechanical actuator so that the desired change is also apparent in the pole-zero plot of the closed loop circuit.

FIG. 1 shows a block diagram of one specific embodiment of a controller 1 according to the present invention.

Controller 1 exhibits a first signal input 3 which is coupled to a first controller element 8. First controller element 8 is coupled to a third controller element 10.

Furthermore, a second signal input 5 is provided, which transmits a received measuring signal 6 to a second controller element 11, to a fourth controller element 9 and to a third controller element 10. Received measuring signal 6 denotes a recorded response by micromechanical actuator 2 to a control signal 7. Second controller element 11 and fourth controller element 9, which modify received measuring signal 6, are connected downstream from second signal input 5. Second controller element 11 minimizes or attenuates the quality of the first mode and possibly further modes by processing received measuring signal 6 of the micromechanical actuator. Fourth controller element 9 adapts the bandwidth of the closed loop circuit of micromechanical actuator 2 by processing received measuring signal 6.

First signal input 3 is implemented to receive reference signal 4 and to transmit this signal to first controller element 8, which filters or attenuates predefined frequency modes and/or predefined frequency components from received reference signal 4 and outputs filtered and/or attenuated reference signal 12.

Third controller element 10 is the actual core of controller 1 and minimizes the deviation between filtered and/or attenuated reference signal 12 and received measuring signal 6. The third controller element outputs minimized reference signal 14 as control signal 7. The modified measuring signal of second controller element 11 and received measuring signal 6 with adapted bandwidth 13 is added to control signal 7 before it is transmitted to micromechanical actuator 2.

First controller element 8 of controller 1 may be designed as a digital filter unit, for example, as an IIR filter, a notch filter or an FIR filter and is used to eliminate, attenuate or suppress undesirable frequency modes or frequency components in the reference variable of reference signal 4.

Second controller element 11 is able to minimize the quality of the first mode of received measuring signal 6. In one specific embodiment, second controller element 11 is able to shift the complex poles of the first mode of measuring signal 6 in the direction of the real axis of the pole-zero plot. This corresponds to an increase in the attenuation. Furthermore, second controller element 11 is able to eliminate the poles of the first mode of measuring signal 6 and insert a new pole with an adapted attenuation factor, for example, 0.707.

In one specific embodiment the quality factor or the attenuation factor of the second or higher modes may be minimized by further feedback of one or multiple pieces of frequency information.

Second controller element 11 exhibits the following transfer function:

$$Gtot1(s) = \frac{G(s)}{1 + H1(s) * G(s)}$$

In this context, H1(s) is a transfer function of at least the first order and exhibits an even or odd order. For example, H1(s) may be defined as follows:

$$H1(s) = \frac{k}{(1 + T * s)}$$

k: DC gain of the transfer function
T: The time constant of the transfer function Gtot1(s) is the resulting transfer function of the closed loop circuit and exhibits at least an order of 3 and an attenuation of 0.1 to 1. The order of the transfer function varies as a function of the order of micromechanical actuator 2.

Fourth controller element 9 is used in order to adapt the band width of the closed loop circuit of micromechanical actuator 2 by receiving and processing measuring signal 6 and, in this way, the entire system including micromechanical actuator 2 and controller 1. For example, the bandwidth of the entire system may be increased.

Fourth controller element 9 exhibits a transfer function of at least the first order and may thus exhibit an even or an odd order.

For fourth controller element 9, this results in the following transfer function:

$$Gto2(s) = \frac{Gtot1(s)}{1 + H2(s) * Gtot1(s)}$$

In particular, the transfer function Gtot2(s) may be a function of at least the fourth order, which may, for example, exhibit an attenuation of D0=0.1 ... 1/(2^–1) ... 1. H2(s) may in this configuration be defined as follows:

$$H2(s) = \frac{k}{(1 = T * s)}$$

k: DC gain of the transfer function
T: The time constant of the transfer function This results in the following transfer function in one specific embodiment:

$$Gtot2(s) = \frac{1}{\left(\frac{1}{G(s)} + H1(s) + H2(s)\right)};$$

$$H2(s) = \frac{k}{(1 + T * s)}$$

For third controller element 10, which may, for example, be a PID controller, this results in the following transfer function:

$$Gtot3(s) = \frac{Gtot2(s) * C(s)}{1 + C2(s) * Gtot2(s)}$$

The transfer function C(s) may be implemented as follows:

$$C(s) = K_R * \left(1 + T_D * s + \frac{1}{T_1 * s}\right)$$

Including first controller element 8, the following transfer function results for the entire system:

$$Gtot(s) = Gtot3(s) * F(s)$$

The transfer function F(s) may be implemented as a digital IIR filter as follows:

$$F(z) = \sum_{i=0}^{m} h(i) * z^i$$

m: Filter order
The transfer function F(s) may be implemented as a digital IIR filter as F(z) as follows:

$$F(z) = \frac{(b_0 + b_1 * z^{-1} + b_2 * z^{-2} + ... + b_M * z^{-M})}{(a_0 + a_1 * z^{-1} + a_2 * z^{-2} + ... + a_N * z^{-N})}$$

N: Filter order
In one specific embodiment, controller 1 includes only blocks having linear functions each.

Here, each linear function may be adapted individually to appropriate micromechanical actuator 2.

In particular, individual controller elements 8 through 11 or functions of individual controller elements 8 through 11 may be connected or disconnected as a function of appropriate micromechanical actuator 2.

The controller structure of controller 1 exhibits little complexity and may be easily implemented in both hardware, for example, in an ASIC, as well as in software, for example, in a DSP or in a processor.

Figure 2:
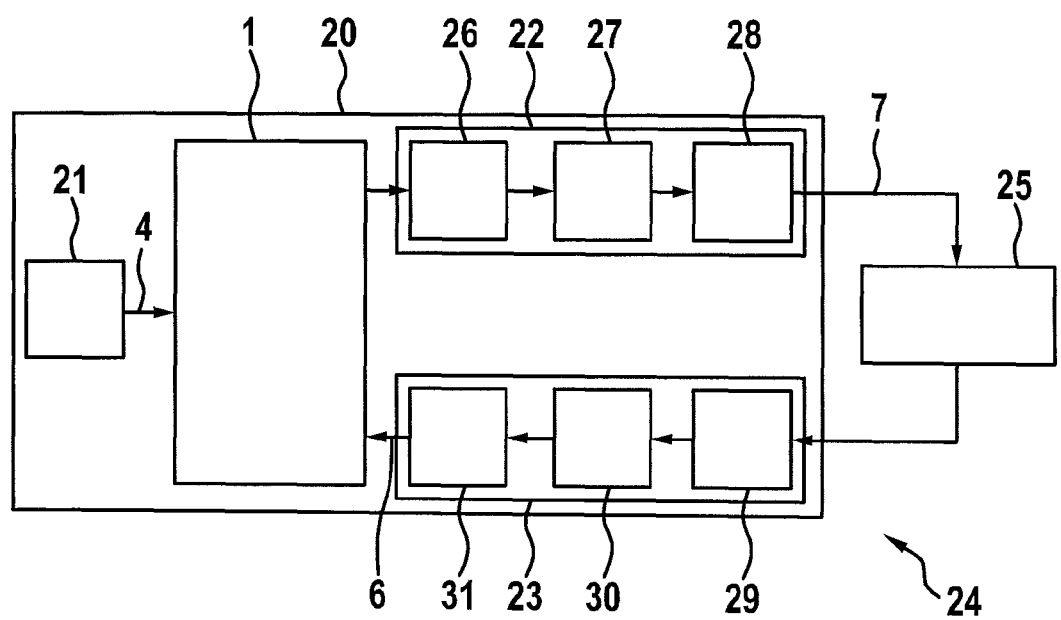
FIG. 2 shows a block diagram of one specific embodiment of an actuating system according to the present invention and a micro-mirror system according to the present invention.

FIG. 2 shows a block diagram of one specific embodiment of actuating system 20 according to the present invention and micro-mirror system 24 according to the present invention.

The transfer function of a micro-mirror 25 is dependent on the individual design of the actuator and the individual sensor. Together, these represent the controlled system. All transfer functions of different micro-mirrors 25 have in common that micro-mirror 25 includes resonance modes and anti-resonance modes.

Figure 6:
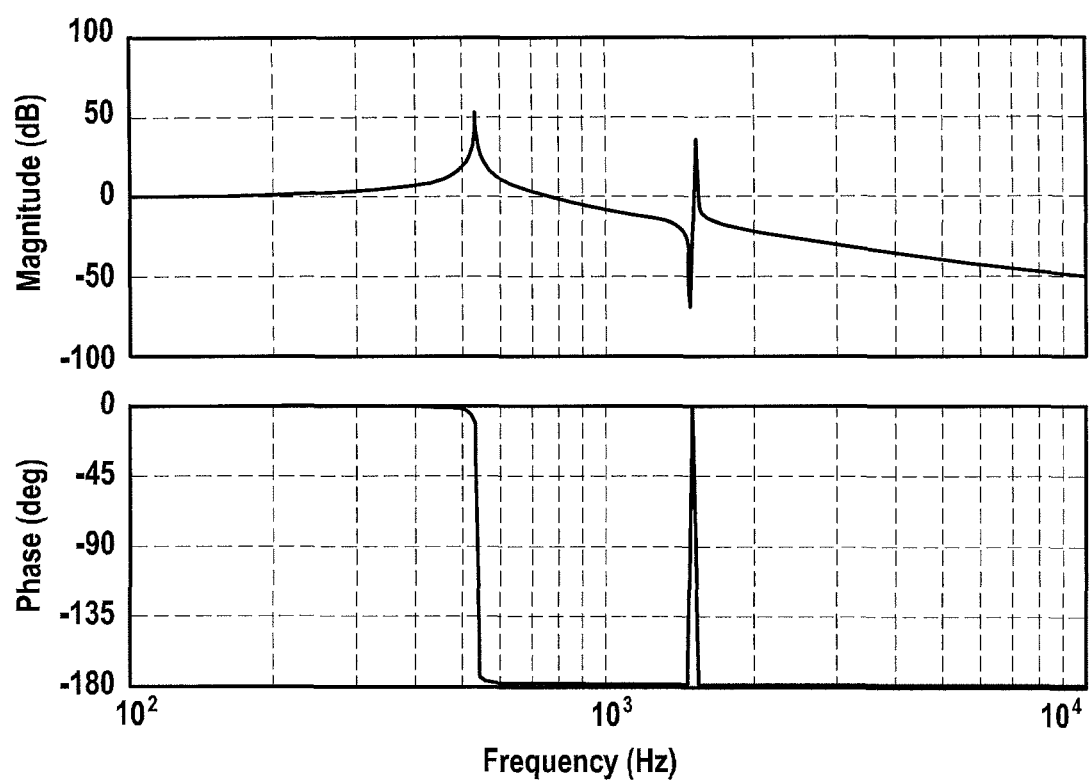
FIG. 6 shows a Bode plot of a micro-mirror.

The controllers for actuating micro-mirrors 25 attempt not to excite the resonance modes and, in this process, to excite or deflect micro-mirror 25 in a quasi-static mode with a frequency of approximately 60 Hz in order to be able to project stable image lines. In FIG. 6, a Bode plot for micro-mirror 25 is explained in greater detail.

In order to actuate one such controlled system of micro-mirror 25 and sensor, actuating system 20 provides signal generator 21, which generates reference signal 4 and outputs it to controller 1.

Controller 1 includes an output, via which the controller outputs a control signal 7 to a first signal processing unit 22 of actuating system 20. First signal processing unit 22 outputs control signal 7 in a processed form to micro-mirror 25.

First signal processing unit 22 in FIG. 2 includes a digital-analog converter 26 which converts control signal 7 of controller 1 into an analog control signal 7. Furthermore, signal processing unit 22 includes a low pass filter 27, which low-pass filters analog control signal 7. Finally, a driver stage 28 or a driver 28 is provided which adapts the filtered control signal in such a way that its level is suitable for actuating of micro-mirror 25.

Actuating system 20 furthermore includes a signal path via which the responses by micro-mirror 25 to control signal 7 are reverted to controller 1. For this purpose, actuating system 20 has a second signal processing unit 23.

At the input, second signal processing unit 23 includes an anti-aliasing filter 29, which outputs the filtered signal to an analog-digital converter 30. Finally, matching algorithms 31 may be provided, which continue to process the signal for controller 1.

Figure 3:
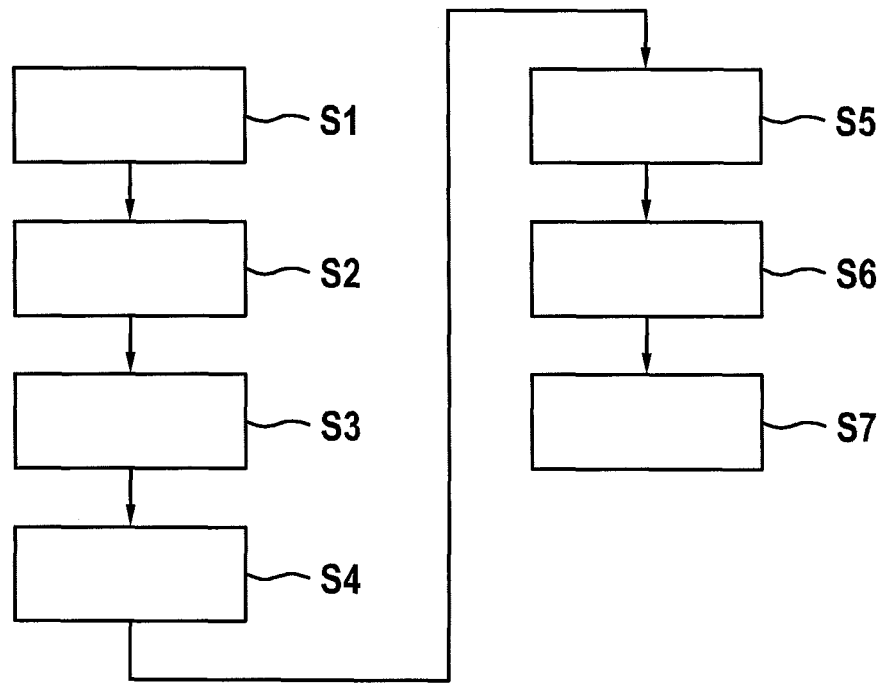
FIG. 3 shows a flow chart of one method of a specific embodiment according to the present invention.

FIG. 3 shows a flow chart of one specific embodiment of a method according to the present invention.

The method provides for receiving a reference signal 4 in a first step S1. In a second step S2, a measuring signal 6 is received, which denotes a recorded response by micromechanical actuator 2 to control signal 7.

The actual signal processing takes place after receiving reference signal 4 and measuring signal 6. In a third step S3, filtering and/or attenuating of predefined frequency modes and/or predefined frequency components in reference signal 4 is/are provided.

In a fourth step S4, received measuring signal 6 is modified by minimizing the quality of the first mode of received measuring signal 6. The modification may in particular, for example, in one specific embodiment, also be carried out in the pole-zero plot of the closed loop circuit by adapting received measuring signal 6 in such a way that the complex poles of the first mode of the closed loop circuit are shifted in the direction of the real axis of the pole-zero plot. In addition or alternatively, by processing received measuring signal 6, the first mode of the closed loop circuit may be entirely attenuated and/or eliminated and, furthermore, by processing received signal 6, an additional pole with a predefined attenuation factor may be situated in the pole-zero plot of the closed loop circuit.

Fifth step S5 provides for minimizing of the deviation between filtered and/or attenuated reference signal 12 and received measuring signal 6 and outputting a minimized reference signal 14.

In a sixth step S6, the bandwidth of the closed loop circuit is adapted by processing received measuring signal 6. In particular, the bandwidth may be increased or decreased, for example. Finally, in step S7, the sum of minimized reference signal 14 and modified measuring signal 13 as well as the received and the adapted measuring signal are transmitted as control signal 7 to micromechanical actuator 2.

Figure 4:
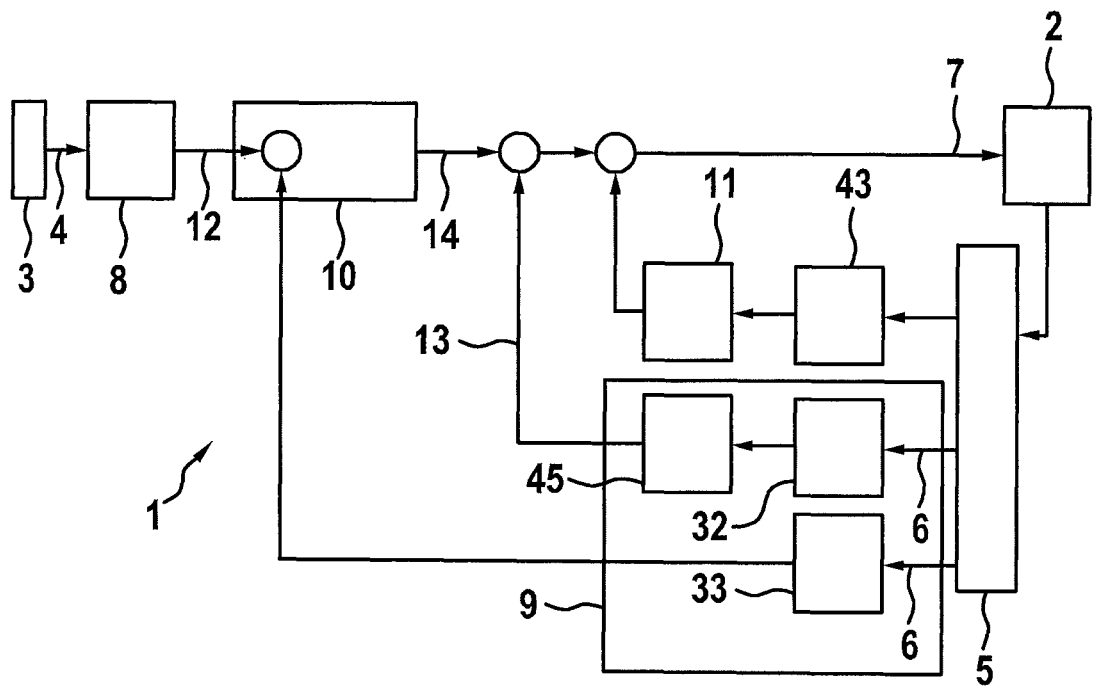
FIG. 4 shows a block diagram of one further specific embodiment of a controller.

FIG. 4 shows a block diagram of another specific embodiment of controller 1 according to the present invention.

Controller 1 in FIG. 4 is based on controller 1 in FIG. 1 and differs from that controller in that fourth controller element 9 includes two filters 32, 33, first filter 32 being situated in front of attenuation element 45 of second controller element 11 and second filter 33 filtering measuring signal 6 which is transmitted to third controller element 10.

Furthermore, filter 43 is provided in front of second controller element 11, which filters received measuring signal 6 before it is transmitted to fourth controller element 11.

Filters 32, 33 and 45 may, for example, be designed as digital IIR filters with the following function:

$$F(z) = \frac{(b_0 + b_1 * z^{-1} + b_2 * z^{-2} + \ldots + b_M * z^{-M})}{(a_0 + a_1 * z^{-1} + a_2 * z^{-2} + \ldots + a_N * z^{-N})}$$

Figure 5:
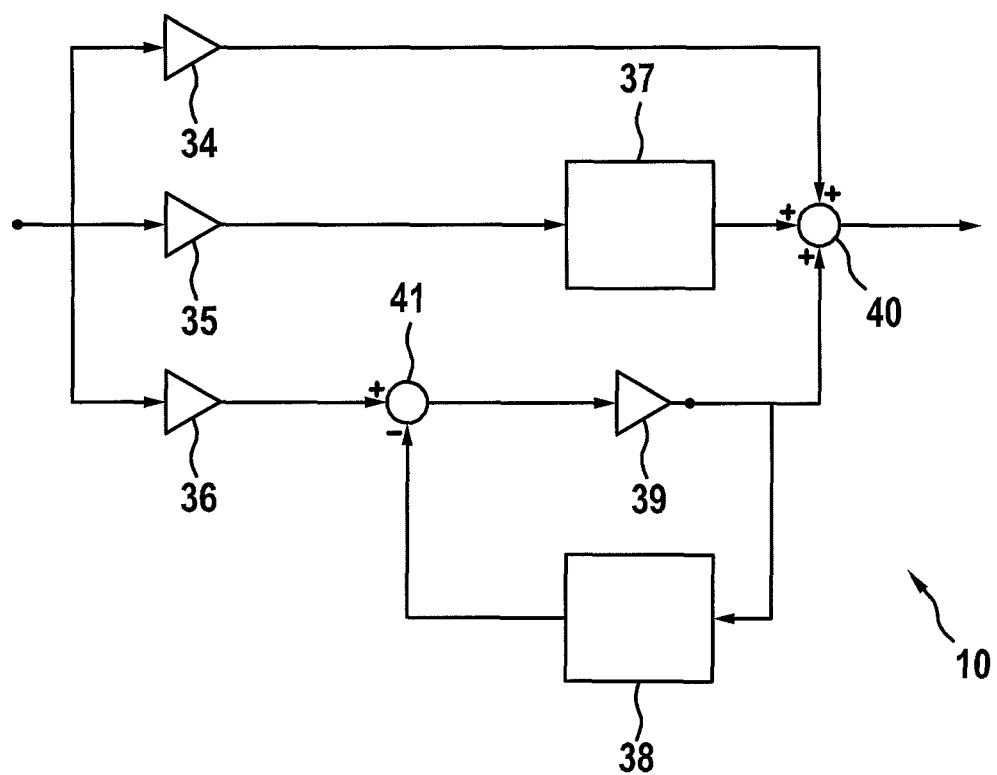
FIG. 5 shows a block diagram of one specific embodiment of a third controller element according to the present invention.

FIG. 5 shows a block diagram of one specific embodiment of third controller element 10 according to the present invention.

Third controller element 10 in FIG. 5 is designed as a PID controller and has three branches, the outputs of which are added in block 40, the result of the sum being the output of PID controller 10.

The output of PID controller 10 is supplied in the first branch to a proportional element 34. In the second branch, the input signal is supplied to a proportional element 35 and to an integrator 37.

The third branch includes proportional element 36 in front of a loop. The loop includes a difference block 41 which establishes the difference between the output of proportional element 36 and the returned variable of the loop and supplies it to an additional proportional element 39 which represents a filter coefficient.

In the return of the loop, a filter 38 is situated which exhibits an integrating function.

FIG. 6 shows a Bode plot of a micro-mirror 25.

The Bode plot shows two individual diagrams which are positioned one upon the other. On the x-axis of the diagrams, the frequency is in each case plotted logarithmically. On the y-axis of the upper diagram, the attenuation in dB of micro-mirror 25 is plotted at the respective frequency. On the y-axis of the lower diagram, the phase of the output signal of micro-mirror 25 is in each case shown at the respective frequency.

In the upper diagram, the curve begins at approximately 0 dB and continues in an approximately parabolic arc up to a frequency of approximately 550 Hz, where it exhibits a local maximum or a first resonance mode with an absolute value of approximately 50 dB. From approximately 550 Hz to 700 Hz, the attenuation declines to approximately 0 dB, only to drop until 1.6 kHz in approximately the shape of a parabola which is open downward, to approximately −70 dB (anti-resonance mode) and immediately afterwards increases sharply to approximately 40 dB (second resonance mode). From there, the signal quickly drops to approximately −10 dB and then continues in a straight line until the end of the diagram at −10 kHz to −50 dB.

In the lower diagram, the phase proceeds at 0° until approximately 500 Hz, then drops sharply at the first resonance mode down to −180 and then rises in the succession of anti-resonance mode and resonance mode again briefly to 0° at approximately 1.6 kHz and then drops again to −180°.

The diagram of FIG. 6 shows how a resonance mode leads to a phase shift of −180°. Furthermore, it is apparent that an anti-resonance mode creates the opposite, a phase shift of +180°.

Figure 7:
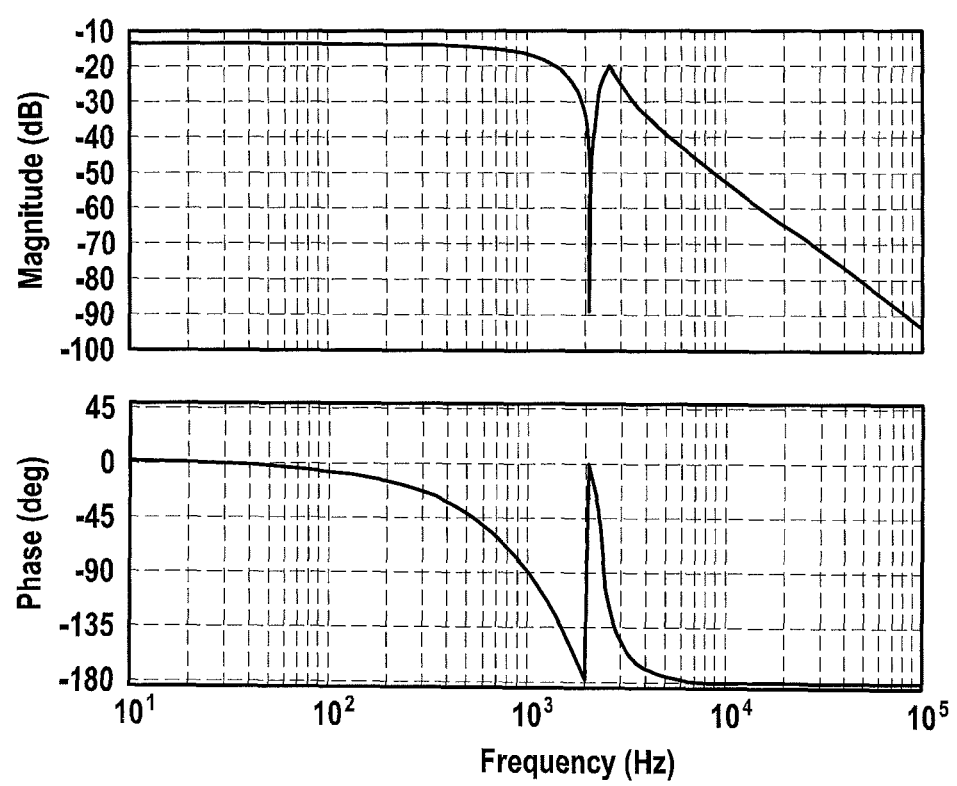
FIG. 7 shows a modified frequency response for the micro-mirror in FIG. 6.

FIG. 7 shows a changed Bode plot for the micro-mirror in FIG. 6 as it is created by second controller element 11.

The upper diagram of FIG. 7 shows clearly that the first resonance mode was eliminated at approximately 550 Hz. The quality of the second resonance mode was likewise minimized at approximately 1.6 kHz.

The frequency response now proceeds up to the position of the anti-resonance mode in approximately the shape of a parabola which is open downward from 0° to 180°, to then rise to 0° and then drop again in the shape of a parabola to −180°.

Figure 8:
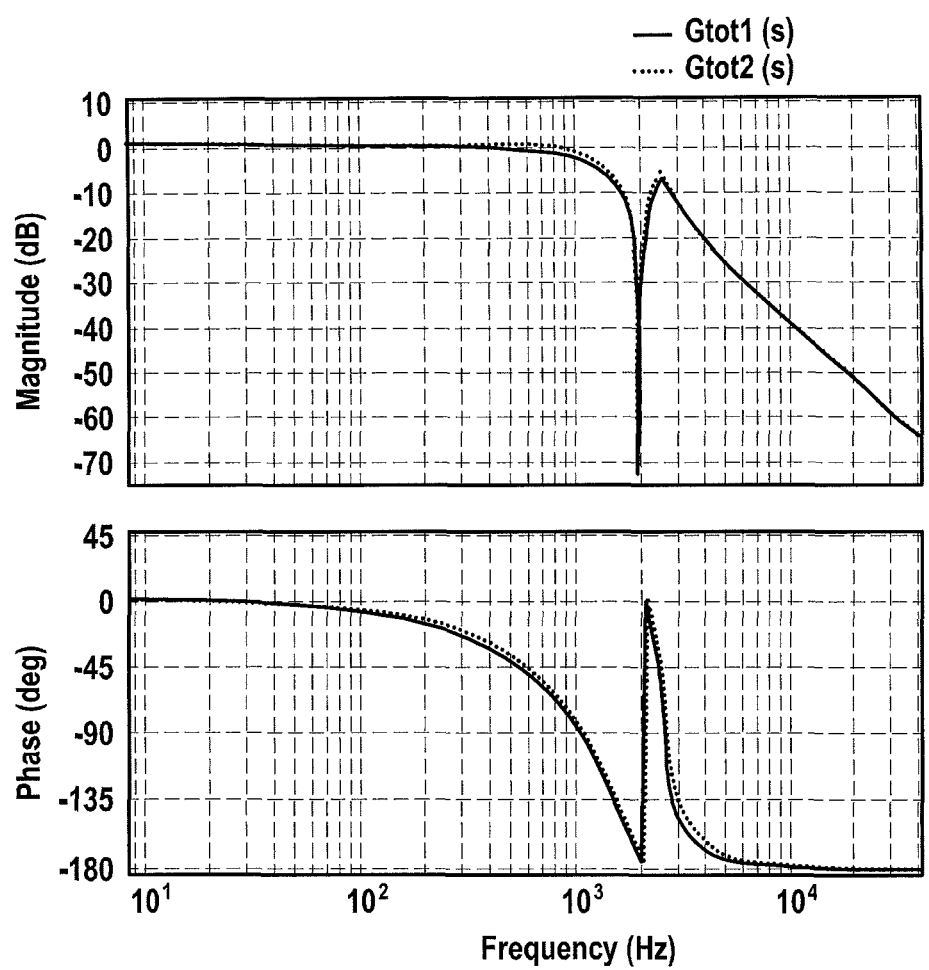
FIG. 8 shows a modified Bode plot for the micro-mirror in FIG. 6.
Figure 9:
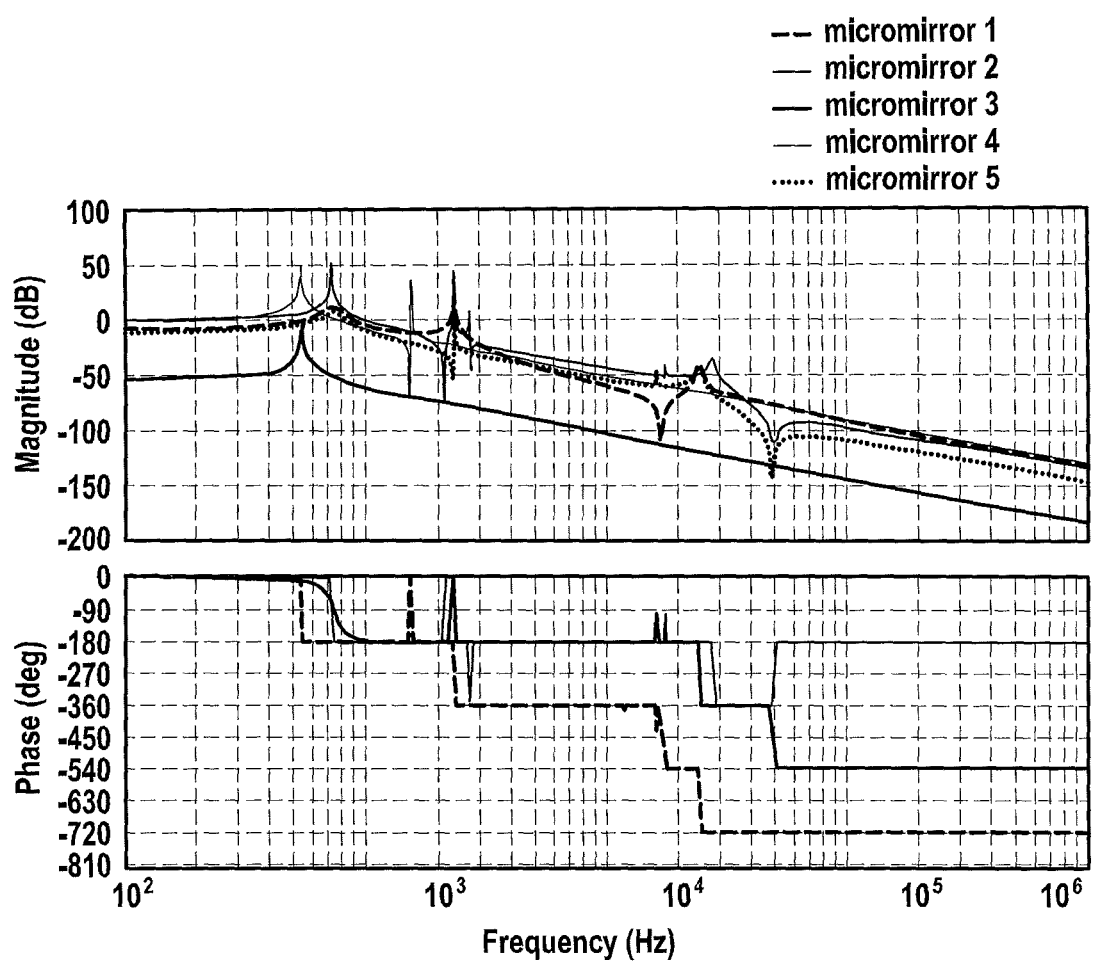
FIG. 9 shows a Bode plot for different MEMS mirrors.
Figure 10:
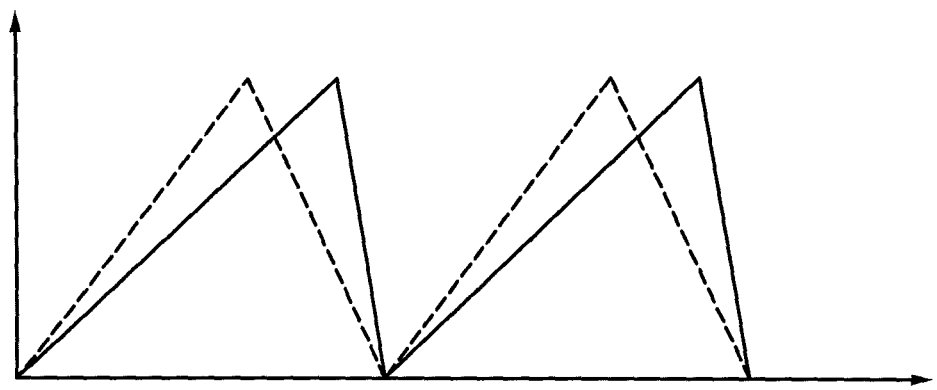
FIG. 10 shows possible sawtooth signals for the actuation of a MEMS mirror in the time range.
Figure 11:
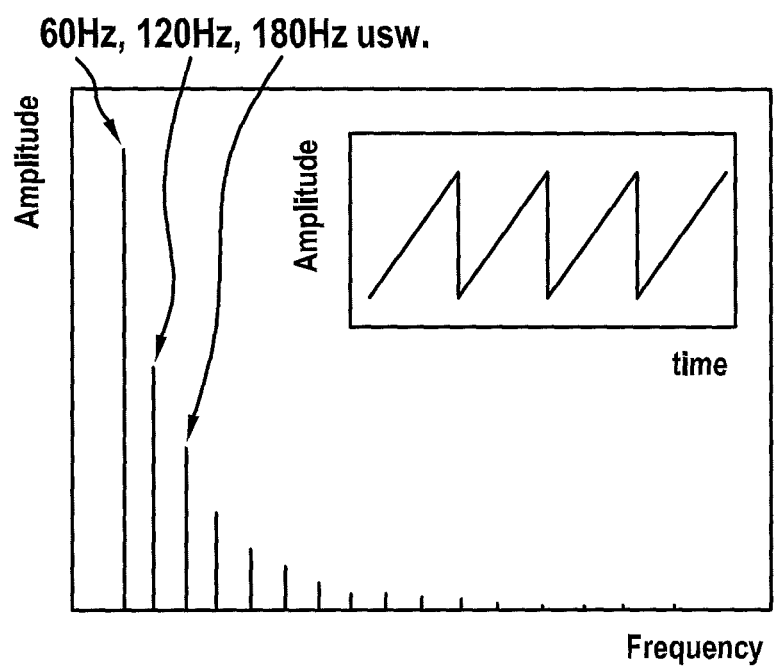
FIG. 11 shows one possible sawtooth signal for the actuation of a MEMS mirror in the frequency range.

FIG. 8 shows a Bode plot with a large bandwidth for the micro-mirror of FIG. 6 in the closed loop circuit as generated by fourth controller element 9 when the signal of fourth controller element 9 is added to the sum of minimized reference signal 14 and measuring signal 13 modified by second controller element 11. For comparison purposes, the curves of the diagram of FIG. 7 are plotted with dashed lines.

For the Bode plot in FIG. 8, the bandwidth of the system including controller 1 and micromechanical actuator 2 was increased by a few Herz.

What is claimed is:

1. A controller for actuating a micromechanical actuator in a closed loop circuit, comprising:
    a first signal input to receive a reference signal;
    a second signal input to receive a measuring signal which denotes a recorded response by the micromechanical actuator to a control signal;
    a first controller element to at least one of filter and attenuate at least one of predefined frequency modes and predefined frequency components in a received reference signal and to output at least one of a filtered and attenuated reference signal;
    a second controller element to modify a received measuring signal to minimize a quality of at least one of a first mode and further modes of the closed loop circuit and to output a modified measuring signal;
    a third controller element to minimize a deviation between the at least one of the filtered and attenuated reference signal and the received measuring signal and to output a minimized reference signal; and
    a fourth controller element to adapt the received measuring signal to adapt a bandwidth of the closed loop circuit and to add the adapted measuring signal to a sum of the minimized reference signal and a modified measuring signal, which creates a control signal.

2. The controller as recited in claim 1, wherein the fourth controller element is configured to adapt at least one of a settling time of the controller in the received measuring signal and a return time of the micromechanical actuator.

3. The controller as recited in claim 1, wherein the second controller element is configured to shift complex poles of the first mode of the micromechanical actuator in a direction of a real axis of a pole-zero plot of the closed loop circuit during the modifying.

4. The controller as recited in claim 1, wherein the second controller element is configured to entirely eliminate, during the modifying, the first mode of the micromechanical actuator in the closed loop circuit and to, furthermore, set up an additional pole with a predefined attenuation factor in a pole-zero plot of the micromechanical actuator in the closed loop circuit.

5. The controller as recited in claim 1, wherein the third controller element includes a proportional-integral-derivative (PID) controller element.

6. The controller as recited in claim 1, wherein the first controller element includes a digital filter element.

7. The controller as recited in claim 1, wherein the first controller element includes at least one of an infinite impulse response (IIR) filter element, a notch filter element, and an finite impulse response (FIR filter) element.

8. An actuating system for actuating a micromechanical actuator in a closed loop circuit, comprising:
    a first signal generator to output a reference signal;
    a controller unit for actuating a micromechanical actuator in a closed loop circuit, including:
        a first signal input to receive the reference signal;
        a second signal input to receive a measuring signal which denotes a recorded response by the micromechanical actuator to a control signal;
        a first controller element to at least one of filter and attenuate at least one of predefined frequency modes and predefined frequency components in a received reference signal and to output at least one of a filtered and attenuated reference signal;
        a second controller element to modify a received measuring signal to minimize a quality of at least one of a first mode and further modes of the closed loop circuit and to output a modified measuring signal;
        a third controller element to minimize a deviation between the at least one of the filtered and attenuated reference signal and the received measuring signal and to output a minimized reference signal; and
        a fourth controller element to adapt the received measuring signal to adapt a bandwidth of the closed loop circuit and to add an adapted measuring signal to a sum of a minimized reference signal and the modified measuring signal, which creates a control signal, and to receive the reference signal and to output the control signal for the micromechanical actuator;
    a first signal processing unit to process the control signal and to transmit the control signal to the micromechanical actuator; and
    a second signal processing unit to record a response by the micromechanical actuator to the control signal and to transmit the measuring signal to the controller, which denotes the recorded response.

9. A micro-mirror system, comprising:
    at least one micro-mirror, and at least one actuating system to actuate the micro-mirror in a closed loop circuit, the actuating system being for actuating a micromechanical actuator in a closed loop circuit, comprising:
        a first signal generator to output a reference signal;
        a controller unit for actuating a micromechanical actuator in a closed loop circuit, including:

a first signal input to receive the reference signal;

a second signal input to receive a measuring signal which denotes a recorded response by the micromechanical actuator to a control signal;

a first controller element to at least one of filter and attenuate at least one of predefined frequency modes and predefined frequency components in the received reference signal and to output the at least one of the filtered and attenuated reference signal;

a second controller element to modify the received measuring signal in order to minimize a quality of at least one of a first mode and further modes of the closed loop circuit and to output a modified measuring signal;

a third controller element to minimize a deviation between the at least one of the filtered and attenuated reference signal and the received measuring signal and to output a minimized reference signal; and a fourth controller element to adapt the received measuring signal in order to adapt a bandwidth of the closed loop circuit and to add the adapted measuring signal to a sum of the minimized reference signal and the modified measuring signal, which creates a control signal, and to receive the reference signal and to output the control signal for the micromechanical actuator;

a first signal processing unit to process the control signal and to transmit the control signal to the micromechanical actuator; and a second signal processing unit to record a response by the micromechanical actuator to the control signal and to transmit the measuring signal to the controller, which denotes the recorded response.

10. A method for actuating a micromechanical actuator in a closed loop circuit, comprising:

receiving a reference signal;

receiving a measuring signal which denotes a recorded response by the micromechanical actuator to a control signal;

at least one of filtering and attenuating at least one of predefined frequency modes and predefined frequency components in the reference signal;

modifying the received measuring signal in order to minimize a quality of at least one of a first mode and further modes of the closed loop circuit;

minimizing a deviation between the at least one of filtered and attenuated reference signal and the received measuring signal and outputting a minimized reference signal;

adapting a bandwidth of the closed loop circuit by adapting the received measuring signal; and transmitting a sum of the minimized reference signal and the modified measuring signal as well as the adapted measuring signal as the control signal to the micromechanical actuator.

11. The method as recited in claim 10, wherein at least one of:

the bandwidth is one of increased and decreased during the adapting, and at least one of a settling time in the received measuring signal and a return time of the controller and the micromechanical actuator is adapted.

12. The method as recited in claim 10, wherein during modification of the received measuring signal, at least one of:

in a pole-zero plot of the micromechanical actuator in the closed loop circuit, complex poles of the first mode of the micromechanical actuator are shifted in a direction of a real axis of the pole-zero plot, and the first mode of the micromechanical actuator in the closed loop circuit is at least one of entirely attenuated and eliminated and, furthermore, an additional pole with a predefined attenuation factor is set up in the pole-zero plot of the micromechanical actuator in the closed loop circuit.

\* \* \* \* \*